(12) United States Patent
Verma

(10) Patent No.: US 11,520,826 B2
(45) Date of Patent: *Dec. 6, 2022

(54) DATA EXTRACTION USING A DISTRIBUTED INDEXING ARCHITECTURE FOR DATABASES

(71) Applicant: BANK OF AMERICA CORPORATION, Charlotte, NC (US)

(72) Inventor: Sandeep Verma, Gurugram (IN)

(73) Assignee: Bank of America Corporation, Charlotte, NC (US)

(*) Notice: Subject to any disclaimer, the term of this patent is extended or adjusted under 35 U.S.C. 154(b) by 526 days.

This patent is subject to a terminal disclaimer.

(21) Appl. No.: 16/280,252

(22) Filed: Feb. 20, 2019

(65) Prior Publication Data

US 2020/0265087 A1 Aug. 20, 2020

(51) Int. Cl.
*G06F 16/901* (2019.01)
*G06F 16/9038* (2019.01)

(52) U.S. Cl.
CPC ........ *G06F 16/901* (2019.01); *G06F 16/9038* (2019.01)

(58) Field of Classification Search
CPC .............. G06F 16/901; G06F 16/9038; G06F 16/2471; G06F 16/2228
USPC ...................................................... 707/696
See application file for complete search history.

(56) References Cited

U.S. PATENT DOCUMENTS

| 5,806,065 | A | 9/1998 | Lomet | |
|---|---|---|---|---|
| 7,937,375 | B2* | 5/2011 | Wong | G06F 21/6227 |
| | | | | 707/696 |
| 8,214,400 | B2 | 7/2012 | Fachan et al. | |
| 9,715,515 | B2 | 7/2017 | Teletia et al. | |
| 9,852,147 | B2 | 12/2017 | von Muhlen et al. | |
| 9,977,805 | B1 | 5/2018 | Bowman et al. | |
| 9,977,807 | B1 | 5/2018 | Bowman et al. | |
| 2007/0198520 | A1* | 8/2007 | McKenney | G06F 16/10 |
| 2007/0294272 | A1* | 12/2007 | Anderson | G06F 16/2272 |
| 2010/0306786 | A1* | 12/2010 | Passey | G06F 9/542 |
| | | | | 707/827 |
| 2012/0191860 | A1* | 7/2012 | Traversal | H04L 67/1093 |
| | | | | 709/230 |

OTHER PUBLICATIONS

Verma, S., "Distributed Indexing Architecture for Databases," U.S. Appl. No. 16/280,219, filed Feb. 20, 2019, 27 pages.

* cited by examiner

*Primary Examiner* — Hosain T Alam
*Assistant Examiner* — Tracy M McGhee

(57) ABSTRACT

A data retrieval device that includes a memory operable to store a data table and an indexing engine implemented by a processor. The indexing engine is configured to receive an index key for data and to determine a set of index table references based on the index key. Each index table reference identifies an index table that links index keys with data location information. The indexing engine is further configured to identify a set of index tables corresponding with the set of index table references and to identify an index table from the set of index tables that contains the index key. The indexing engine is further configured to retrieve a data location information linked with the index key from the index table, to retrieve the data from the data table based on the data location information, and to output the retrieved data.

17 Claims, 6 Drawing Sheets

DATA EXTRACTION USING A DISTRIBUTED INDEXING ARCHITECTURE FOR DATABASES

TECHNICAL FIELD

The present disclosure relates generally to databases, and more specifically to a distributed indexing architecture for databases.

BACKGROUND

In conventional big data systems data may be scattered across multiple machines and/or locations. These systems are designed to support large data sets which may contain thousands or millions of records. One of the technical challenges for such a big data system is associated with creating an indexing system that can also be distributed across multiple machines. Implementing a conventional index system in each machine is not a viable option because these indexing systems are typically large data structures which consume a lot of memory resources. As the index system grows, every instance of the index system would need to be simultaneously managed and updated. This process involves constant communications with other devices and frequent updates which consumes both bandwidth and processing resources.

Thus, it is desirable to provide a technical solution that provides the ability to implement an indexing architecture that can be distributed among multiple devices.

SUMMARY

In conventional big data systems data may be scattered across multiple machines and/or locations. These systems are designed to support large data sets which may contain thousands or millions of records. One of the technical challenges for such a big data system is associated with creating an indexing system that can also be distributed across multiple machines. Implementing a conventional index system in each machine is not a viable option because these indexing systems are typically large data structures which consume a lot of memory resources. As the index system grows, every instance of the index system would need to be simultaneously managed and updated. This process involves constant communications with other devices and frequent updates which consumes both bandwidth and processing resources.

Another technical challenge for big data systems is the amount of time it takes to search a conventional indexing system. Conventional indexing systems are typically implemented using a large binary tree structure. Locating information in a binary tree structure involves performing linear searches. The amount of time required for performing a linear search increases as the depth of the binary tree increases. In other words, the amount of time required to search the binary tree increases linearly as the binary tree grows over time. This means that processing resources will be occupied for longer periods of time as the indexing system grows and the search time increases. The performance of a device implementing a conventional indexing system degrades of over time dur to the steady increase in the amount of consumed memory and processing resources.

The system described in the present application provides a technical solution to the technical problems discussed above by employing a distributed indexing architecture for a database. The disclosed system provides several advantages which include 1) providing an architecture that allows index tables to be partitioned and distributed among multiple devices and 2) enabling the ability to perform parallel searches of index tables which reduces search times.

The database system provides a distributed indexing architecture that can be used to distribute index tables among multiple devices. The system is configured to store data and to identify an index key and data location information for the stored data. The system then determines a set of index table references based on the index key. Each index table reference identifies an index table where the index key and data location information may be stored. The system then stores the index key and data location information in one or more of the index tables identified by the set of index table references. These index tables may be distributed among and located in one or more devices. In addition, each index table may use consume less memory resources since they can be partitioned and distributed among multiple devices.

The database system is further configured to receive a data request for data that comprises an index key that is linked with the data. In response to receiving the index key, the system determines a set of index table references based on the index key. The system then searches the index tables identified by the set of index table references to determine which index table contains the index key. The system may search the index tables in parallel or simultaneously to determine which index table contains the index key. Parallel searching reduces the amount of time required to search for the index key. Once the system identifies an index table that contains the index key, the system extracts the data location information for the data that is stored with the index key. The system can then retrieve the data based on the data location information.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system described in the present application provides a technical solution to the technical problems discussed above by employing a distributed indexing architecture for a database. The disclosed system provides several advantages which include 1) providing an architecture that allows index tables to be partitioned and distributed among multiple devices and 2) enabling the ability to perform parallel searches of index tables which reduces search times.

Figure 1:
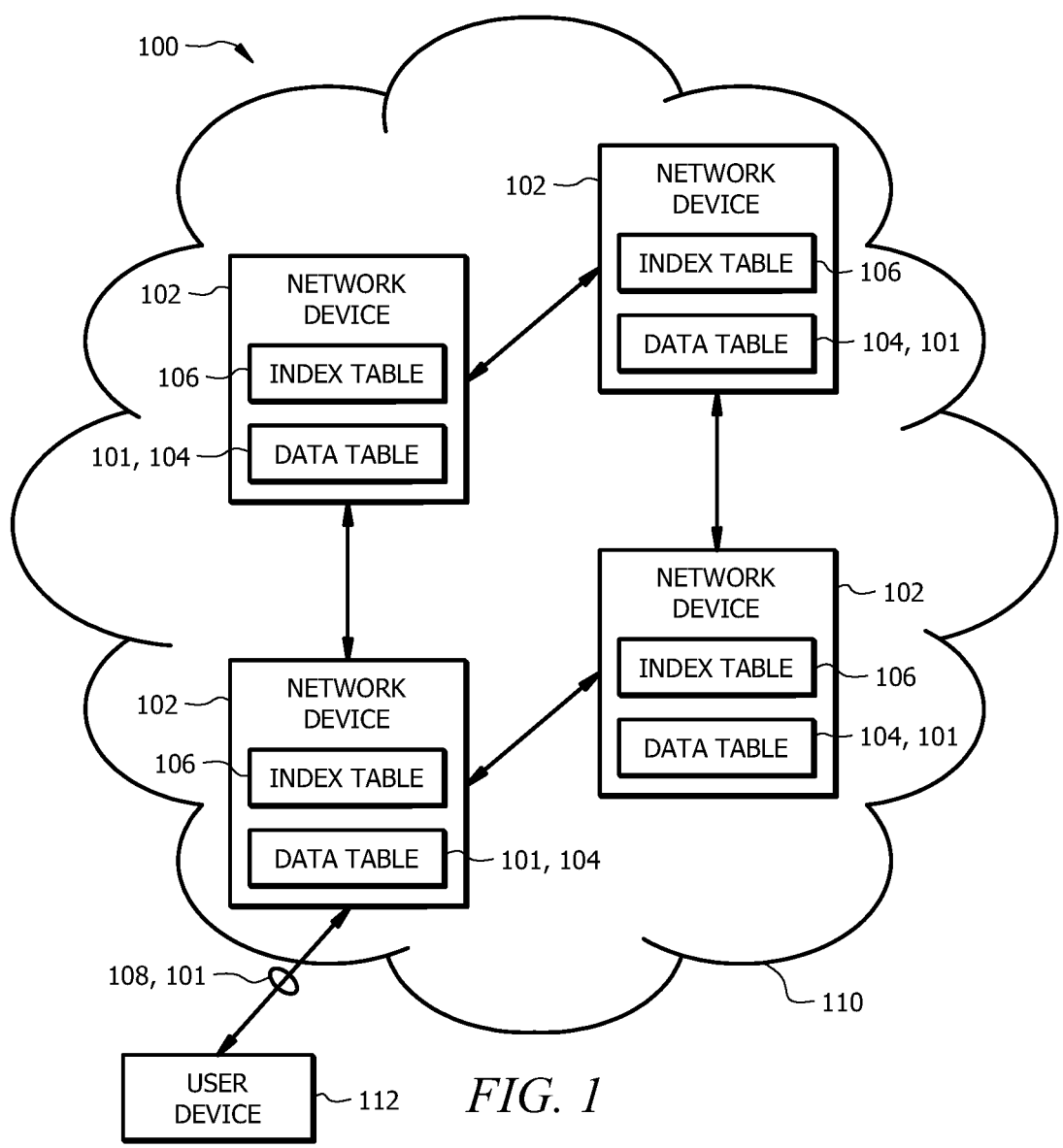
FIG. 1 is a schematic diagram of an embodiment of a system configured to implement a distributed indexing architecture for a database.
Figure 2:
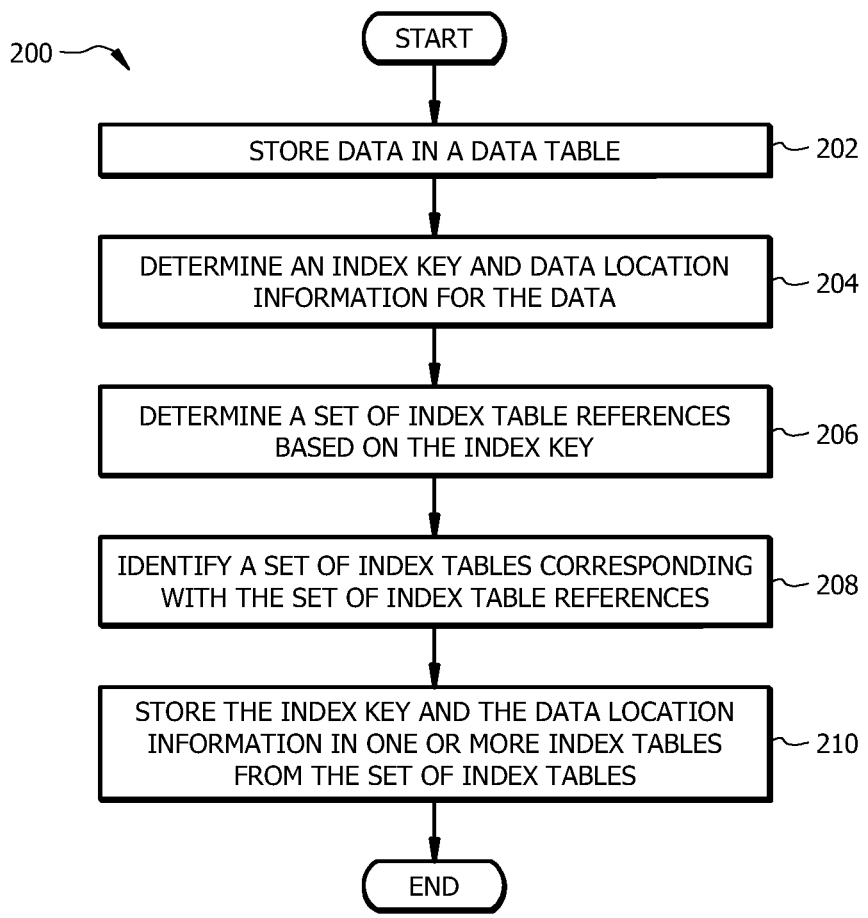
FIG. 2 is an embodiment of a flowchart of an index key storing method.
Figure 3:
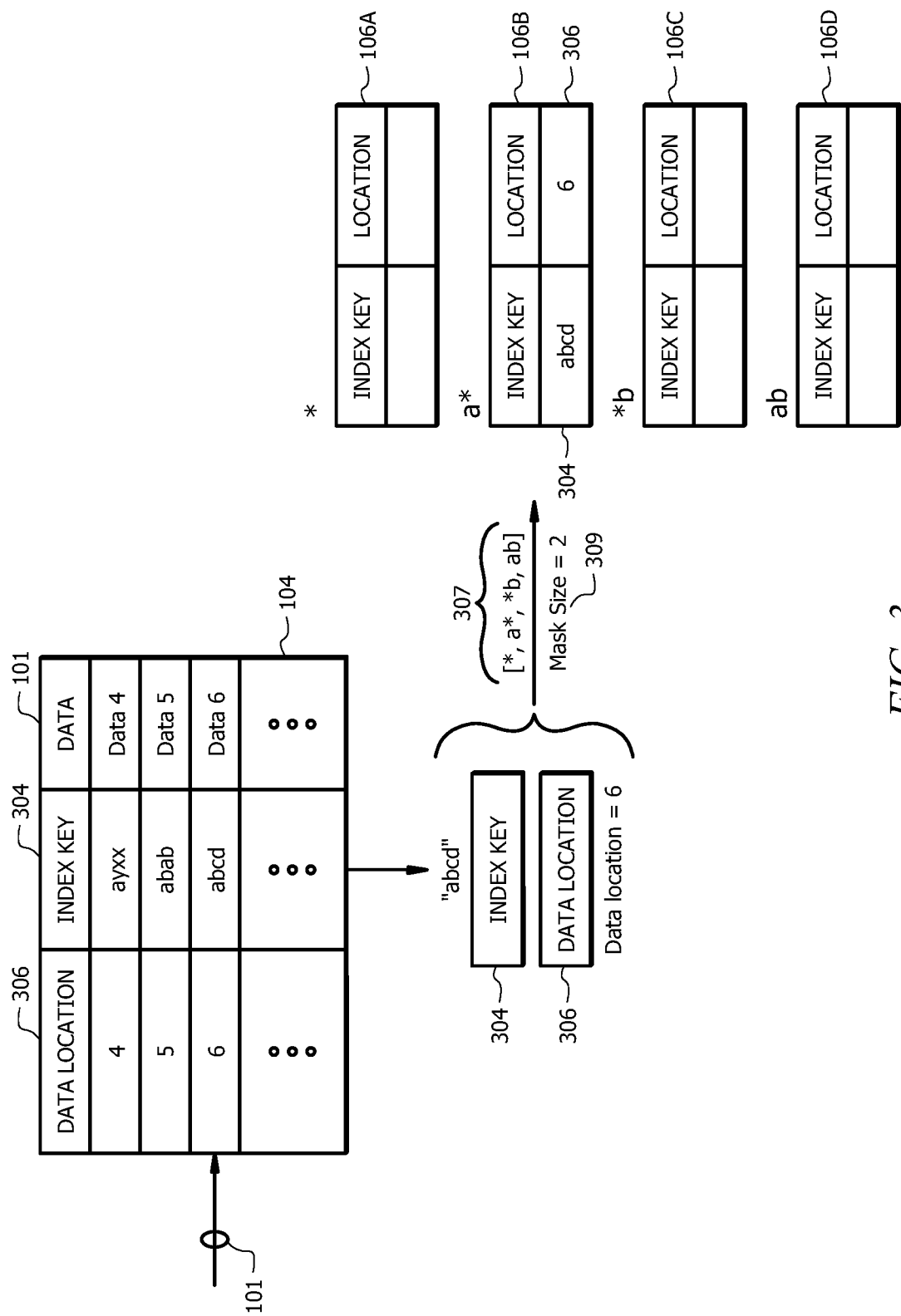
FIG. 3 is an illustrated example of the index storing method.
Figure 4:
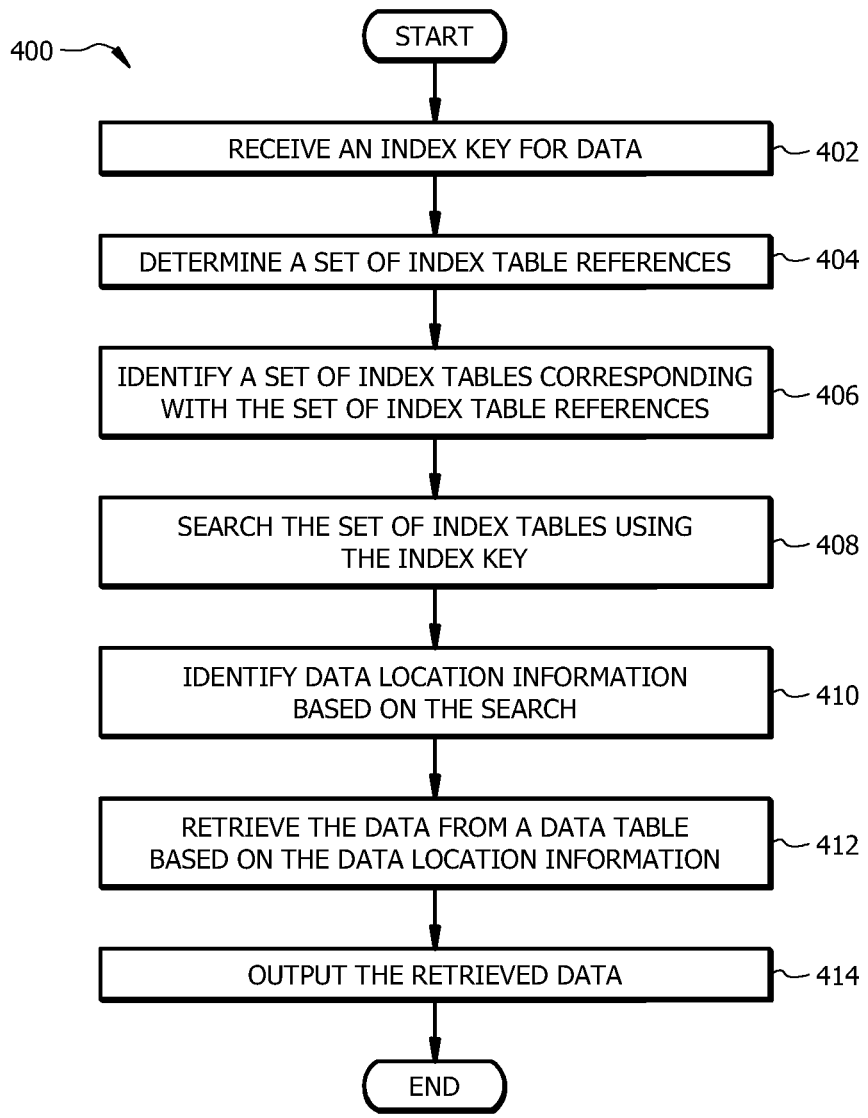
FIG. 4 is an embodiment of a flowchart of a data retrieving method.
Figure 5:
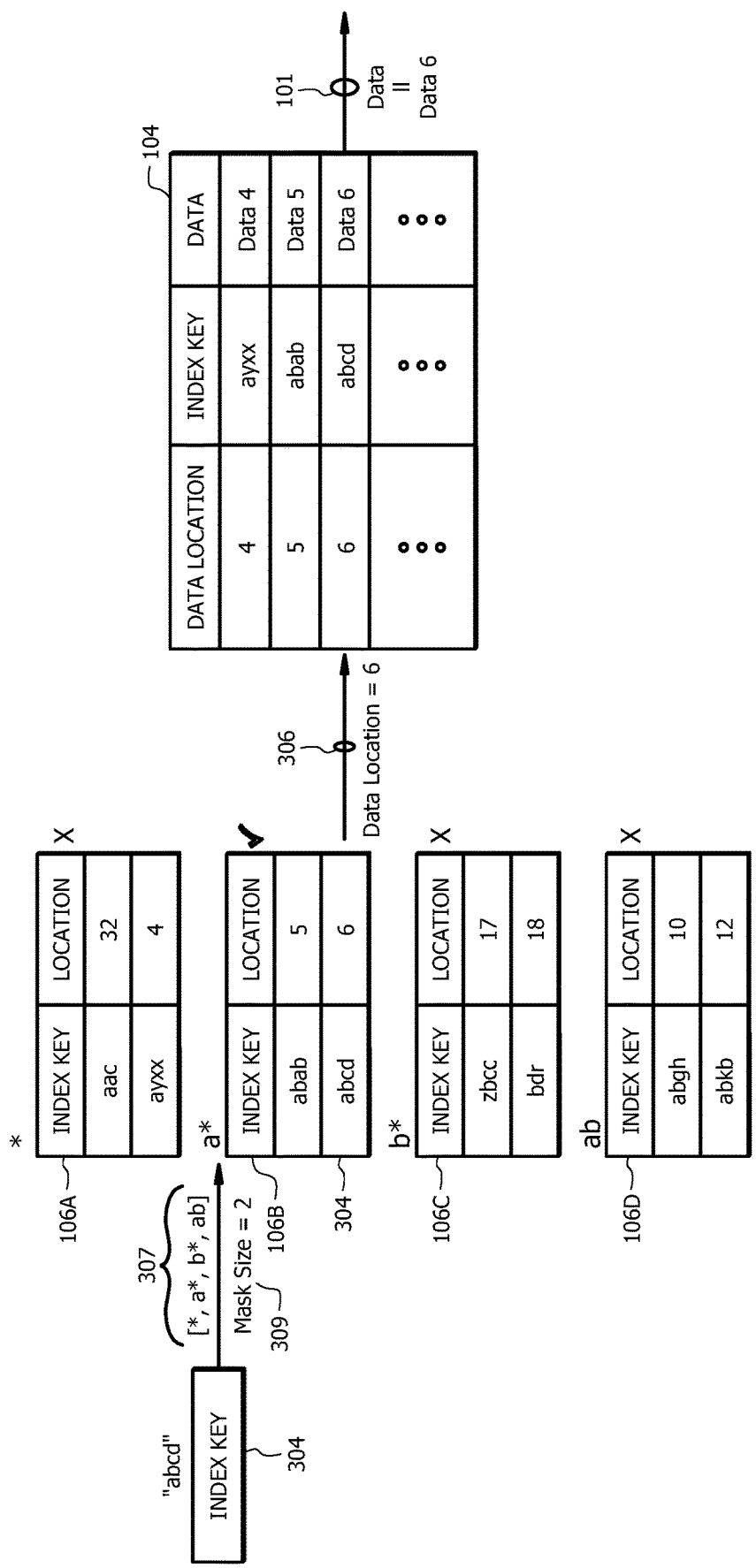
FIG. 5 is an illustrated example of the data retrieving method.
Figure 6:
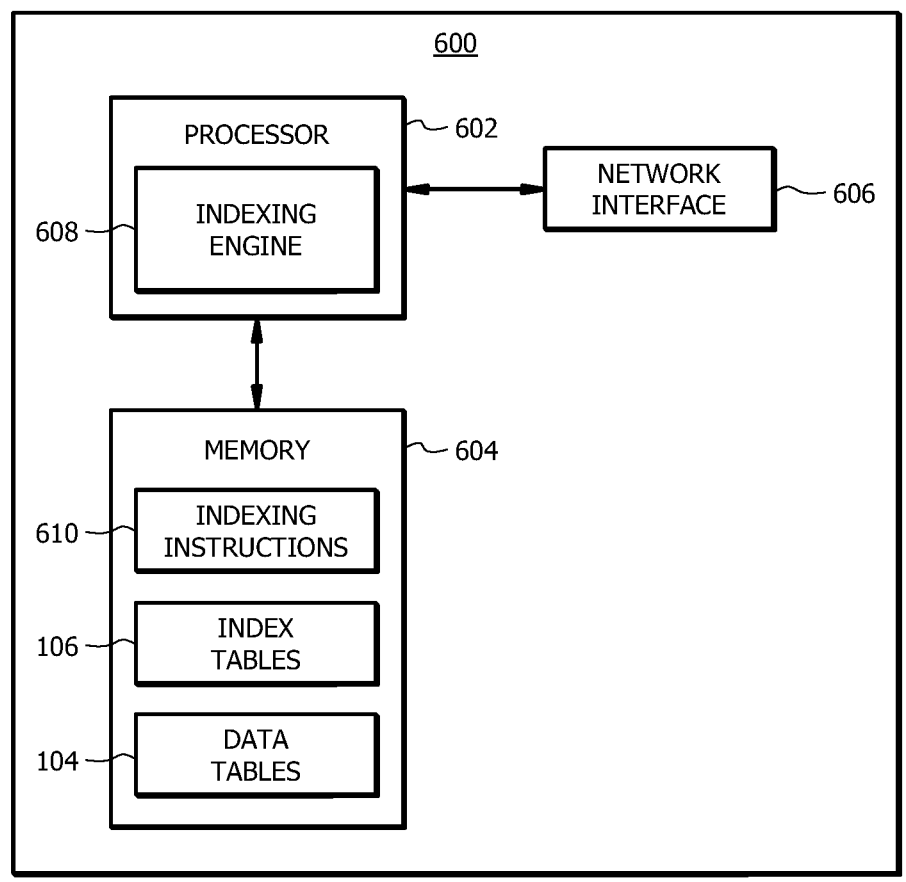
FIG. 6 is an embodiment of a device configured to implement a distributed indexing architecture for a database.

FIG. 1 is an example of a system configured to implement a distributed indexing architecture for a database. FIGS. 2 and 3 combine to provide an example of a process for storing data and an index key for the data using the distributed indexing architecture. FIGS. 4 and 5 combine to provide an example of a process for retrieving data and an index key for the data using the distributed indexing architecture. FIG. 6 is an example of a device configured to implement a distributed indexing architecture for a database.

FIG. 1 is a schematic diagram of an embodiment of a database system 100 configured to implement a distributed indexing architecture. The database system 100 provides an indexing architecture that can be used to distribute index tables among multiple devices (e.g. network devices 102). The system 100 is configured to store data 101 in a data structure (e.g. data table 104) and to identify an index key and data location information for the stored data 101. The system 100 then determines a set of index table references based on the index key. Each index table reference identifies an index table 106 where the index key and data location information may be stored. The system 100 then stores the index key and data location information in one or more of the index tables 104 identified by the set of index table references. The index tables 106 may be distributed among and/or located in one or more network devices 102. In addition, each index table 104 may use consume less memory resources since they can be partitioned and distributed among multiple devices. Additional information about storing data 101 using distributed index tables 104 is described in FIGS. 2 and 3.

The database system 100 is further configured to receive a data request 108 for data 101 that comprises an index key that is linked with the data 101. In response to receiving the index key, the system determines a set of index table references based on the index key. The system 100 then searches the index tables 104 identified by the set of index table references to determine which index table 104 contains the index key. The system 100 may search the index tables 104 in parallel or simultaneously to determine which index table 104 contains the index key. Parallel searching reduces the amount of time required to search for the index key. Once the system 100 identifies an index table 104 that contains the index key, the system 100 extracts the data location information for the data 101 that is stored with the index key. The system 100 can then retrieve the data 101 from a data table 106 based on the data location information. Additional information about retrieving data 101 using distributed index tables 104 is described in FIGS. 4 and 5.

In one embodiment, the database system 100 comprises one or more network devices 102 in signal communication with each other in a network 110. Examples of a network device 102 include, but are not limited to, computers, databases, web servers, or any other suitable type of network device. One or more of the network devices 102 may be in signal communication with other devices (e.g. user devices 112). For example, a network device 102 may be configured to receive a data request 108 that comprises an index key for data 101 from a user device 112 and to send the requested data 101 to the user device 112. Examples of user devices 112 include, but are not limited to, computers, mobile devices (e.g. smart phones or tablets), Internet-of-things (IoT) devices, web clients, web servers, or any other suitable type of device.

The network 110 is any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art upon viewing this disclosure.

Data Storing Process

FIG. 2 is an embodiment of a flowchart of an index key storing method 200. Method 200 may be implemented by an indexing engine 608 in a device (e.g. network device 102) for storing data 101 and index keys linked with the data 101 using a distributed index table architecture.

At step 202, the indexing engine 608 stores data 101 in a data table 104. In one embodiment, the indexing engine 608 may receive the data 101 from another device (e.g. a network device 102 or user device 112) and store the data 101 in response to receiving the data 101. In another embodiment, the indexing engine 608 may be implemented on the device that generates or provides the data 101 to the indexing engine 608. Referring to FIG. 3 as an example, the indexing engine 608 stores data 101 (shown as 'Data 6') in a data table 104. The data 101 is stored at a particular data location (shown as 'row 6') and is linked with an index key 304 (shown as 'abcd'). In one embodiment, the indexing engine 608 stores the data 101 in the data table 104 by appending the data 101 to the end of the data table 104 without sorting the data table 104. In other words, the indexing engine 608 adds the data 101 to the bottom of the data table 104 without reorganizing the data 101 the data table 104.

Returning to FIG. 2 at step 204, the indexing engine 608 determines an index key 304 and data location information 306 for the data 101. The index key 304 is an alphanumeric or numeric identifier that is uniquely linked with data 101. For example, the index key 304 may comprise a string of characters. The data location information 306 may be any suitable information that indicates the location of where the data 101 is stored. For example, the data location information 306 may comprise a device identifier (e.g. a device name, an MAC address, or an IP address), a file name, a data table 104, and/or a location (e.g. a row or column) within the data table 104. Continuing with the example from FIG. 3, the indexing engine 608 determines that the data 101 is stored at 'row 6' in the data table 104 and is associated with an index key 304 value of 'abcd.'

Returning to FIG. 2 at step 206, the indexing engine 608 determines a set of index table references 307 based on the index key 304. Each index table reference 307 corresponds with and identifies an index table 106. An index table 106 is a data structure that links index keys 304 with data location information 306. In one embodiment, the index table 106 is a table data structure. In other embodiments, the index table 106 may be a file, a document, or any other suitable type of data structure.

Each index table reference 307 may be an identifier that comprises one or more characters. In one embodiment, an index table reference 307 comprises fewer character than the number of characters in the index key 304. In one embodiment, the indexing engine 608 determines an index table reference 307 by determining a mask size 309 and extracting a set of characters equal to the mask size 309 from the index key 304 starting from the beginning of the index key 304. The indexing engine 608 may also replace one or more characters from the set of extracted characters with a wildcard character (e.g. '*'). A wildcard character is a placeholder character that can represent any character. Continuing with the example from FIG. 3, the mask size 309 in this example is two. Here, the indexing engine 608 extracts the first two characters (i.e. 'a' and 'b') from the index key 'abcd.' The indexing engine 608 then generates different combinations of the extracted characters by replacing one or more of the extracted characters with a wildcard character (e.g. '*') to generate index table references 307. In this example, the indexing engine 608 generates a set of index table references 307 that comprises '**' (shown as '*'), 'a*', '*b', and 'ab'. In other examples, the mask size may be set to any other suitable value.

Returning to FIG. 2 at step 208, the indexing engine 608 identifies a set of index tables 106 corresponding with the set of index table references 307. Continuing with the example from FIG. 3, the indexing engine 608 identifies index tables 106A, 106B, 106C, and 106D that each correspond with an index table reference 307 from the set of index table references 307. The index tables 106A-106D may be stored on one or more network devices 102. In this example, identifying the set of index tables 106 comprises identifying network devices 102 where one or more index tables 106 are being stored. For instance, index tables 106A and 106B may be stored in a first network device 102 and index tables 106C and 106D may be stored in a second network device 102. In other examples, all of the identified index tables 106A-106D may be stored in a single network device 102.

Returning to FIG. 2 at step 210, the indexing engine 608 stores the index key 304 and the data location information 306 in one or more of the identified index tables 106. In one embodiment, the indexing engine 608 stores the index key 304 and the data location information 306 by identifying an index table 106 with the fewest number of entries and storing the index key 304 and the data location information 306 in the identified index table 106. In this example, the indexing engine 106 performs load balancing by storing index keys 304 and data location information 106 in index tables 106 with more storage capacity. In one embodiment, the indexing engine 608 stores the index key 304 and the data location information 306 by sending the index key 304 and the data location information 306 to another network device 104 that contains the index table 106. In some embodiments, the indexing engine 608 may store the index key 304 and the data location information 306 in more than one index table 106. In this case, the indexing engine 608 creates duplicate entries in multiple index tables 106 which provides redundancy and allows for reduced search times since the index key 304 and data location information 306 can be retrieved from multiple sources. Continuing with the example from FIG. 3, the indexing engine 608 stores the index key 304 and the data location information 306 in index table 106B.

Data Retrieval Process

FIG. 4 is an embodiment of a flowchart of a data retrieving method 400. Method 400 may be implemented by an indexing engine 608 in a device (e.g. network device 102) for retrieving data 101 and index keys 304 linked with the data 101 using a distributed index table architecture.

At step 402, the indexing engine 608 receives an index key 304 for data 101. For example, the indexing engine 608 may receive a data request 108 from a network device 102 or a user device 112. The data request 108 comprises an index key 304 for data 101. Referring to FIG. 5 as an example, the indexing engine 608 may receive an index key 304 with a value of 'abcd.'

Returning to FIG. 4 at step 404, the indexing engine 608 determines a set of index table references 307. The indexing engine 608 may determine the set of index table references 307 using a process similar to the process described in step 206 of FIG. 2. Continuing with the example from FIG. 5, the indexing engine 608 determines a set of index table references 307 that comprises '*', 'a*', '*b', and 'ab'.

Returning to FIG. 4 at step 406, the indexing engine 608 identifies a set of index tables 106 corresponding with the set of index table references 307. The indexing engine 608 may identify the set of index tables 106 using a process similar to the process described in step 208 of FIG. 2.

At step 408, the indexing engine 608 searches the set of index tables 106 using the index key 304 to identify an index table 106 that contains the index key 304. The indexing engine 608 may use the index key 304 as a token for searching the set of index tables 106. For example, the indexing engine 608 may compare the received index key 304 to the index keys 304 stored in each index table 608 to determine which index table 106 contains the index key 304. In one embodiment, the indexing engine 608 searches the set of index table 106 in parallel or at the same time. In this case, the indexing engine 608 may use multiple processors or devices to simultaneous search the set of index tables 106. Searching multiple index tables 106 in parallel reduces the amount of time required to identify an index table 106 that contains the index key 304. Continuing with the example from FIG. 5, the indexing engine 608 searches index tables 106A-106D to determine which index table 106 contains the index key 304. In this example, index table 106B contains the index key 304.

Returning to FIG. 4 at step 410, the indexing engine 608 identifies data location information 306 based on the search results. In the identified index table 106, the index key 304 is linked with the data location information 306 for the data 101. The data location information 306 may identify a device identifier (e.g. a device name, an MAC address, or an IP address), a file name, a data table 104, and/or a location (e.g. a row or column) within the data table 104. Continuing with the example from FIG. 5, the index key 304 is linked with a data location information 306 corresponding with 'row 6' in the data table 104.

Returning to FIG. 4 at step 412, the indexing engine 608 retrieves the data 101 from the data table 104 based on the data location information 306. Here, the indexing engine 608 retrieves the data 101 stored in the data table 101 and the data location identified by the data location information 306. Continuing with the example from FIG. 5, the indexing engine 608 retrieves the data 101 (shown as 'Data 6') from the data table 101 at the data location (i.e. row 6) identified by the data location information 306.

Returning to FIG. 4 at step 414, the indexing engine 608 outputs the retrieved data 101. For example, the indexing engine 608 may send the data 101 to the device that originally requested the data 101.

Data Manipulation Detection Device

FIG. 6 is an embodiment of a device 600 (e.g. network device 102) configured to implement a distributed indexing architecture for a database. The device 600 comprises a processor 602, a memory 604, and a network interface 606. The device 600 may be configured as shown or in any other suitable configuration.

The processor 602 comprises one or more processors operably coupled to the memory 604. The processor 602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 604. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the indexing engine 608. In this way, processor 602 may be a special purpose computer designed to implement function disclosed herein. In an embodiment, the indexing engine 608 is implemented using logic units, FPGAs, ASICs, DSPs, or any other suitable hardware. The indexing engine 608 is configured as described in FIGS. 2-4.

The memory 604 comprises one or more disks, tape drives, or solid-state drives, and may be used as an over-flow data storage device, to store programs when such programs are selected for execution, and to store instructions and data that are read during program execution. The memory 604 may be volatile or non-volatile and may comprise read-only memory (ROM), random-access memory (RAM), ternary content-addressable memory (TCAM), dynamic random-access memory (DRAM), and static random-access memory (SRAM).

The memory 604 is operable to store indexing instructions 610, index tables 106, data tables 104, and/or any other data or instructions. The indexing instructions 610 may comprise any suitable set of instructions, logic, rules, or code operable to execute the indexing engine 608. The index tables 106 and the data tables 104 are configured similar to the index tables 106 and the data tables 104 described in FIGS. 2-4.

The network interface 606 is configured to enable wired and/or wireless communications. The network interface 606 is configured to communicate data between the device 600 and other devices (e.g. network devices 102 or user devices 112), systems, or domain. For example, the network interface 606 may comprise a WIFI interface, a local area network (LAN) interface, a wide area network (WAN) interface, a modem, a switch, or a router. The processor 602 is configured to send and receive data using the network interface 606. The network interface 606 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A data retrieval device, comprising:
a memory device operable to store:
    a plurality of data tables; and
    a plurality of index tables, wherein each index table comprises:
        a plurality of index keys; and
        each index key is associated with data location information that identifies where data is stored; and
a hardware processor operably coupled to the memory device, configured to:
    receive a data request comprising an index key for data stored in a data table,
wherein the index key comprises a string of characters;
    determine a set of index table references based on the index key, wherein:
        each index table reference comprises a subset of characters from the index key;
        at least one of the index table references comprises a subset of characters from the index key and a wildcard character that represents any character;
        each index table reference identifies an index table from among the plurality of index tables; and
        determining the set of index table references comprises:
            determining a mask size, wherein the mask size is equal to a number of characters for each index table reference;
            extracting a set of characters from the index key starting from the beginning of the index key, wherein the number of extracted characters is equal to the mask size; and
            replacing a character from the set of characters with a wild card character;
    identify a set of index tables from among the plurality of index tables corresponding with the set of index table references;
    identify an index table from the set of index tables that contains the index key;
    retrieve a data location information linked with the index key from the index table, wherein the data location information identifies a data table and a location within the data table where the data is stored;
    retrieve the data from the data table based on the data location information; and
    output the retrieved data.

2. The device of claim 1, wherein identifying the index table from the set of index tables that contains the index key comprises searching the set of index tables in parallel.

3. The device of claim 1, wherein each index table reference comprises fewer characters than the number of characters in the index key.

4. The device of claim 1, wherein identifying the set of index tables comprises identifying one or more network devices storing at least one index table from the set of index tables.

5. The device of claim 1, wherein identifying the index table that contains the index key comprises comparing the index key to the index keys stored the set of index tables.

6. The device of claim 1, wherein:
receiving the index key comprises receiving the index key from a user device; and
outputting the data comprises sending the data to the user device.

7. A data retrieval method, comprising:
receiving a data request comprising an index key for data, wherein the index key comprises a string of characters;
determining a set of index table references based on the index key, wherein:
each index table reference comprises a subset of characters from the index key;
at least one of the index table references comprises a subset of characters from the index key and a wildcard character that represents any character;
each index table reference identifies an index table from among a plurality of index tables, wherein each index table comprises:
a plurality of index keys; and
each index key is associated with data location information that identifies where data is stored; and
determining the set of index table references comprises:
determining a mask size, wherein the mask size is equal to a number of characters for each index table reference;
extracting a set of characters from the index key starting from the beginning of the index key, wherein the number of extracted characters is equal to the mask size; and
replacing a character from the set of characters with a wild card character;
identifying a set of index tables from among the plurality of index tables corresponding with the set of index table references;
identifying an index table from the set of index tables that contains the index key;
retrieving a data location information linked with the index key from the index table, wherein the data location information identifies a data table and a location within the data table where the data is stored;
retrieving the data from a data table based on the data location information; and
outputting the retrieved data.

8. The method of claim 7, wherein identifying the index table from the set of index tables that contains the index key comprises searching the set of index tables in parallel.

9. The method of claim 7, wherein each index table reference comprises fewer characters than the number of characters in the index key.

10. The method of claim 7, wherein identifying the set of index tables comprises identifying one or more network devices storing at least one index table from the set of index tables.

11. The method of claim 7, wherein identifying the index table that contains the index key comprises comparing the index key to the index keys stored the set of index tables.

12. The method of claim 7, wherein:
receiving the index key comprises receiving the index key from a user device; and
outputting the data comprises sending the data to the user device.

13. A computer program product comprising executable instructions stored in a non-transitory computer readable medium that when executed by a processor causes the processor to:
receive a data request comprising an index key for data, wherein the index key comprises a string of characters;
determine a set of index table references based on the index key, wherein:
each index table reference comprises a subset of characters from the index key;
at least one of the index table references comprises a subset of characters from the index key and a wildcard character that represents any character;
each index table reference identifies an index table from among a plurality of index tables, wherein each index table comprises:
a plurality of index keys; and
each index key is associated with data location information that identifies where data is stored; and
determining the set of index table references comprises:
determining a mask size, wherein the mask size is equal to a number of characters for each index table reference;
extracting a set of characters from the index key starting from the beginning of the index key, wherein the number of extracted characters is equal to the mask size; and
replacing a character from the set of characters with a wild card character;
identify a set of index tables from among the plurality of index tables corresponding with the set of index table references;
identify an index table from the set of index tables that contains the index key;
retrieve a data location information linked with the index key from the index table, wherein the data location information identifies a data table and a location within the data table where the data is stored;
retrieve the data from a data table based on the data location information; and
output the retrieved data.

14. The computer program product of claim 13, wherein identifying the index table from the set of index tables that contains the index key comprises searching the set of index tables in parallel.

15. The computer program product of claim 13, wherein identifying the set of index tables comprises identifying one or more network devices storing at least one index table from the set of index tables.

16. The computer program product of claim 13, wherein identifying the index table that contains the index key comprises comparing the index key to the index keys stored the set of index tables.

17. The computer program product of claim 13, wherein:
receiving the index key comprises receiving the index key from a user device; and outputting the data comprises sending the data to the user device.

\* \* \* \* \*